(12) United States Patent
Ungureanasu et al.

(10) Patent No.: US 7,962,493 B2
(45) Date of Patent: Jun. 14, 2011

(54) DYNAMIC COMPUTATION OF IDENTITY-BASED ATTRIBUTES

(75) Inventors: Cezar Ungureanasu, Sammamish, WA (US); John H. Zybura, Seattle, WA (US); Matthias Leibmann, Woodinville, WA (US); Pallavi Gajula, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 291 days.

(21) Appl. No.: 11/682,093

(22) Filed: Mar. 5, 2007

(65) Prior Publication Data

US 2008/0222096 A1     Sep. 11, 2008

(51) Int. Cl.
*G06F 17/30* (2006.01)
(52) U.S. Cl. .......................... 707/754; 707/758
(58) Field of Classification Search ............... 707/1–10, 707/758
See application file for complete search history.

(56) References Cited

U.S. PATENT DOCUMENTS

| | | | |
|---|---|---|---|
| 6,088,679 A | 7/2000 | Barkley | 708/8 |
| 6,202,066 B1 | 3/2001 | Barkley | 707/785 |
| 7,024,693 B2 | 4/2006 | Byrne | |
| 7,171,411 B1 | 1/2007 | Lewis et al. | 1/1 |
| 7,467,142 B2 * | 12/2008 | Sinn et al. | 707/10 |
| 7,483,896 B2 * | 1/2009 | Johnson | 707/9 |
| 2002/0144142 A1 | 10/2002 | Shohat | 726/4 |
| 2003/0217127 A1 | 11/2003 | Sinn | |
| 2004/0010514 A1 | 1/2004 | Agarwal et al. | |
| 2004/0078368 A1 | 4/2004 | Excoffier et al. | |
| 2004/0243822 A1 | 12/2004 | Buchholz et al. | |
| 2005/0138061 A1 | 6/2005 | Kuehr-McLaren et al. | |
| 2005/0138419 A1 | 6/2005 | Gupta et al. | |
| 2006/0004848 A1 | 1/2006 | Williams et al. | |
| 2006/0040247 A1 | 2/2006 | Templin | |
| 2006/0047813 A1 | 3/2006 | Aggarwal et al. | |
| 2007/0220268 A1 * | 9/2007 | Krishnaprasad et al. | 713/182 |
| 2008/0010287 A1 * | 1/2008 | Hinton et al. | 707/10 |

FOREIGN PATENT DOCUMENTS

WO   WO2004114160 A2   12/2004

OTHER PUBLICATIONS

Dongwan, et al., "Ensuring information assurance in federated identity management", Date: 2004, pp. 821-826, http://ieeexplore.ieee.org/xpl/abs_free.jsp?arNumber=1395193.

Li Gong, "A Secure Identity-Based Capability System", Date: 1989, pp. 56-63 http://doi.ieeecomputersociety.org/10.1109/SECPRI.1989.36277.

(Continued)

*Primary Examiner* — Mohammad Ali
*Assistant Examiner* — Huawen Peng
(74) *Attorney, Agent, or Firm* — Merchant & Gould

(57) ABSTRACT

Enterprise Identity Management systems control access to information derived from identity-related data stored in various data repositories. An identity-based management system can automatically and dynamically compute derived data when the source data changes. Rule-base tools can be used to compute derived data from arbitrary attribute-based datasets. Dynamic computation of identity-based attributes within information system servers allows data to be aggregated and normalized from multiple data sources deployed across an organization so that updated related information can be persisted and pushed to various servers in the organization.

20 Claims, 3 Drawing Sheets

OTHER PUBLICATIONS

Michael F. Worboys, "Modelling changes and events in dynamic spatial systems with reference to socio-economic units", Date: 2001, http://www.spatial.maine.edu/~worbovs/mywebpapers/napthlion2001.pdf.

Russell, et al., "Access Control for Dynamic Virtual Organisations", http://www.allhands.org.uk/submissions/papers/140.pdf.
International Search Report mailed Jul. 24, 2008, issued in PCT/US2008/054152.

* cited by examiner

DYNAMIC COMPUTATION OF IDENTITY-BASED ATTRIBUTES

BACKGROUND

Enterprise Identity Management systems control access to information derived from identity-related data stored in various data repositories. Examples of the data include email distribution lists or system resource access rights based on identity-based attributes such as job function, office location, department, and reporting relationship. Maintaining such information often requires an administrator's direct input and a knowledge of the relationships of the data, which can be quite complex.

As identity attributes (such as users, employees, contractors, customers, and the like) join, leave, and change positions within the organization, their attributes frequently change. This usually requires that relational data be updated as needed to reflect these changed attributes. Conversely, derived data sets (such as new lists or entitlements) are populated based on current user attributes. The challenge of maintaining this derived data current becomes even more difficult as the both the source and the derived datasets become larger and/or more volatile and/or more distributed.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

The present disclosure is directed to efficient means of computing derived data for an identity-based management system automatically and dynamically, such as when the source data changes. Computing derived data automatically and dynamically reduces IT costs through automation and timeliness, and increases security by ensuring entitlements are accurately assigned and reported. Dynamically computing the derived data can be applied to identity-based application domains such as attribute-based distribution list memberships regardless where that data is natively accessed.

Dynamic computation of identity-based attributes can be implemented as a general rule-based tool for computing data regardless of the types of attributes and attribute relationships used by any specific organization. The rule-base tool can be used to compute derived data from arbitrary attribute-based datasets.

The rule set can comprise rules that describe how disparate objects in an identity-based application store are related to one another, and rules which describe the actual computations over the attributes of related objects. The two types or rules allow high-order business logic to be described in a more modular and intuitive way. Productivity is typically improved through reuse of rules describing similar attribute computations which share the same conditions for object relationships. Additional productivity can also be improved through determining the scope of the recalculation: when changes are made in the system, typically only the rules and relationships affected by that change would then be marked to be recalculated.

Dynamic computation of identity-based attributes within information system servers allows data to be aggregated and normalized from multiple data sources deployed across the organization, so that not only is all the requisite data for the computation is persisted, but the dynamically computed results can be pushed to the system(s) to be updated with the result as the results are computed. Accordingly, systems (to where the computed results are pushed) do not require knowledge of the computation and necessary relationships of the data. The systems (to where the data is pushed) typically works with its known data types and attributes, while the computation, relationship building, and derivation are typically performed by the information system server. Incorporation of computation of identity-based attributes within an information system server can also be used to leverage the efficient relational query capabilities within an SQL server.

These and other features and advantages will be apparent from a reading of the following detailed description and a review of the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

DETAILED DESCRIPTION

Figure 1:
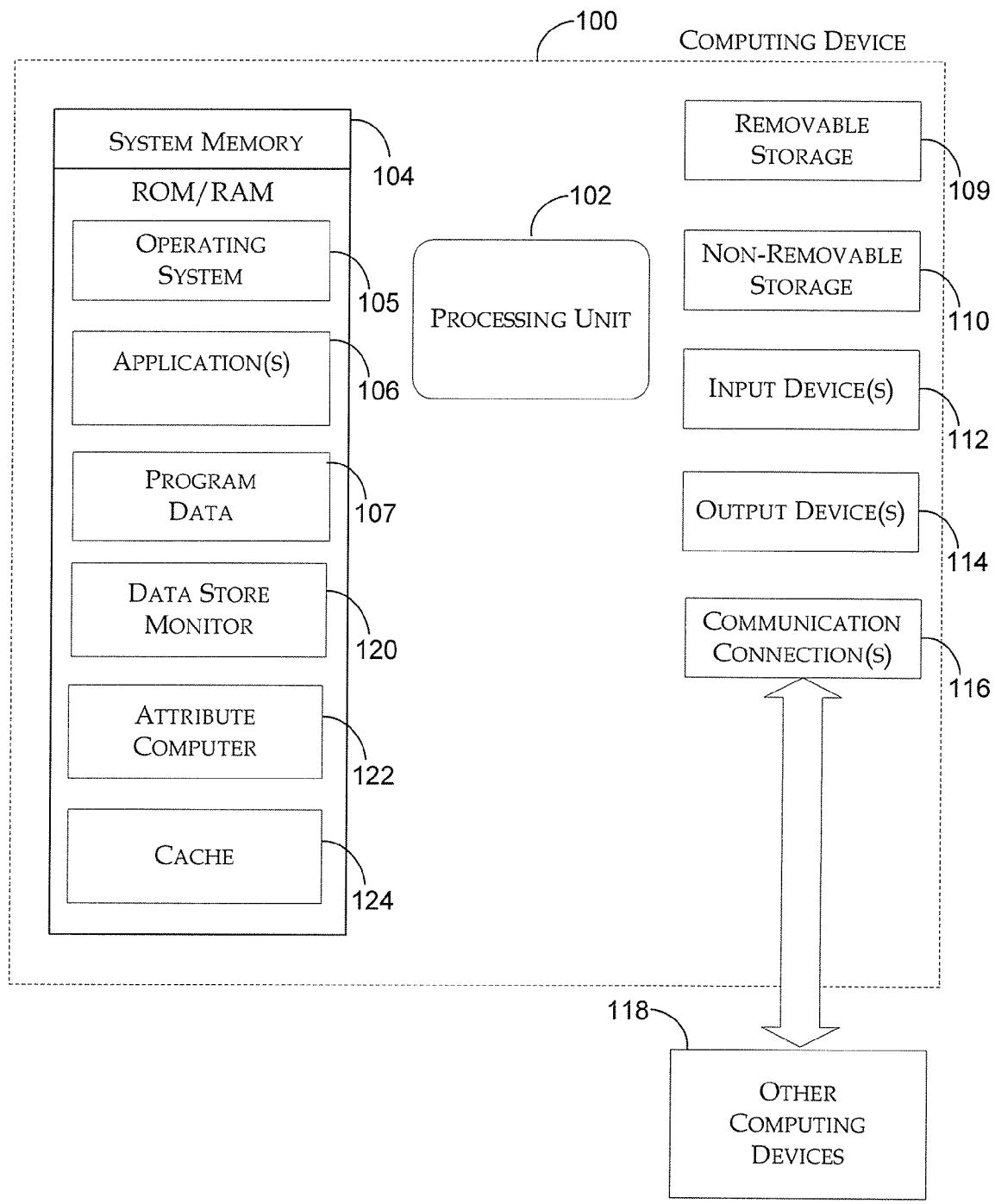
FIG. 1 is an illustration of an example operating environment and system for dynamic computation of identity-based attributes.

As briefly described above, embodiments are directed to dynamic computation of identity-based attributes. With reference to FIG. 1, one example system for managed code assemblies includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107 such that data store monitor 120, attribute computer 122, and cache 124 can be implemented (which are discussed below).

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In accordance with the discussion above, computing device 100 system memory 104 (and processor 102, and related peripherals can be used to implement data store monitor 120, attribute computer 122, and cache 124. Data store monitor 120, attribute computer 122, and cache 124 in an embodiment can be used to implement dynamic computation of identity-based attributes (described below with reference to FIGS. 2-3). Data store monitor 120 can be used for detecting changes to identity-based attributes for structured data in a data store and changes to relationships amongst the structured data. Attribute computer 122 can be used for computing in response to a detected change a computed attribute for a query (that can be an identity function, for example). Cache 124 can be used for persisting the computed attribute and sending the computed attribute in response to a query that be the same (or substantially similar to) or different from the query for which the change was detected.

Figure 2:
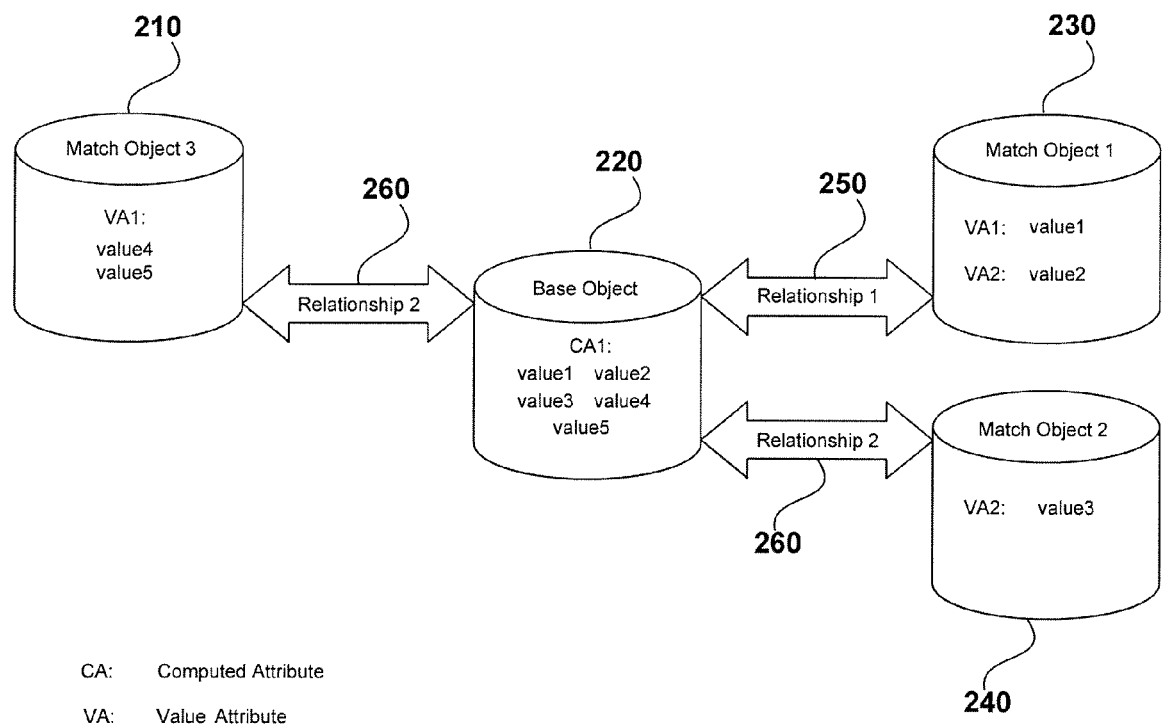
FIG. 2 is an illustration of dynamically calculated, identity-based attributes.

FIG. 2 is an illustration of dynamically calculated, identity-based attributes. In an embodiment, an identity-based attribute computation can be directly associated with an attribute chosen to hold the result of the computation. The chosen attribute thus becomes dedicated to the result of the computation, and can be referred to as a "computed attribute." The value of a computed attribute typically only changes when the result of the computation itself changes.

A straightforward implementation could perform the actual computation on-demand whenever the computed attribute is accessed. However, to improve processing efficiency, another implementation can use a more sophisticated system whereby the result of the computation is cached. While this approach typically requires more physical storage, it typically reduces computational overhead since identity-based attribute computations are normally only executed when the inputs into the computation change.

In dynamic computation of identity-based attributes, the values of a computed attribute on a specific object are calculated from the attribute values present on a set of related objects (which may or may not include the object holding the computed attribute). In a server implementation, the object holding the computed attribute is called the "base object" (220), and the set of related objects are called "match objects" (210, 230, and 240). The base object itself may also be a match object.

After the base and match objects have been established, an arbitrary operation over the set of values from all match objects can be performed to produce a resultant set of values for the computed attribute. In general, any mathematical operation can be used for the computation, depending on the amount of flexibility desired for a given scenario.

In one embodiment, the operations can be restricted to only allow the relocation of values to different operations. (In other embodiments operations can be supported that modify the content of individual values, such as arithmetic or string manipulation operators.) The feature of identity-based attribute computations is typically implemented on top of "normalized" identity data store. In the embodiment, any value-level transformations are performed before the data enters the normalized identity store. (In other embodiments value-level transformation operators can be provided.)

In the embodiment, the transformation from match object values into computed attribute values is defined by listing the names of one or more attributes from the match objects which thus forms the computed value set. These attributes are called "value attributes." Thus the result of the computation is the union of all values from all value attributes from all match objects.

As illustrated in FIG. 2, two relationships (250 and 260) and two value attributes are used to compute five values from the three match objects. Thus components used to define a computed attribute for the example comprises two lists. The first is the list of relationships, and the second is the list of value attributes. The definition of CA1 in this example can be given as follows in Table I:

TABLE I

CA1 Definition

Relationships: "Relationship 1", "Relationship 2"
Value Attributes: "VA1", "VA2"

In the embodiment, the definitions are stored in the DSML schema of the aggregate identity store, using custom XML elements to extend the DSML schema description format. An example extended DSML definition for CA1 can be written as:

```
<ms-dsml:computed-attribute-type id="CA1" ms-
                    dsml:indexed="true"
                    ms-dsml:indexable="true">
    <dsml:name>CA1</dsml:name>
    <ms-dsml:value-attribute ref="#VA1" />
    <ms-dsml:value-attribute ref="#VA2" />
    <ms-dsml:relationship ref="#Relationship1" />
    <ms-dsml:relationship ref="#Relationship2" />
</ms-dsml:computed-attribute-type>
```

The example DSML definition does not describe how the relationships are defined. Not defining the relationships in the DSML code illustrates an important modularity in the definitions of identity-based attribute computations. The conditions that define a relationship are normally established independently of the computations which use those relationships.

The modularity allows the logic for a relationship to be reused in multiple computations. It also potentially allows different parties, with different areas of expertise, to author relationships and computations independently. The modularity of the code can thus offer a significant improvement in system manageability.

A relationship can be defined as any set of conditions that can be evaluated to determine the set of match objects for a given base object. In an embodiment, a relationship can be defined by three optional components: a "filter" on the match object, a "filter" on the base object, and a list of "search conditions." A "filter" is an arbitrary test that can be applied to a single object to determine if it is a candidate for the relationship. A "search condition" is a test that can take as input both the match object and the base object, and determine if the two objects are related according to the specific attribute values on each. A relationship is determined to exist between two objects when the match filter test passes, when the base filter test passes, and when all search condition tests pass. If any of these tests has not been defined for a given relationship, then that test is considered to always pass. The definition of a relationship can be given as follows in Table II:

TABLE II

Relationship Definition

Match filter: <Arbitrary test on match object>
Base filter: <Arbitrary test on base object>
Search Condition 1: <Arbitrary condition between both objects>
Search Condition 2: <Arbitrary condition between both objects>
...
Search Condition N: <Arbitrary condition between both objects>

In an embodiment, a "filter" is defined as a mathematical combination of Boolean operators, conditional operators, constant values, and object attributes. A typical example for a filter might be "title starts-with 'VP' and buildingNumber=22." This filter would only pass for objects whose "title" attribute has the string prefix "VP" and whose "buildingNumber" attribute has the numeric value 22.

A "search condition" can be primarily defined by two listing attributes, one called the "base attribute" and one called the "match attribute." A simple search condition is considered to "pass" for a given pair of base object and match object when the match attribute on the match object and the base attribute on the base object share at least one value in common.

However, there can be three additional options on a search condition that influence the matching logic. The first is an "inversion" flag which negates the result of the search condition. In other words, an inverted search condition passes for a given pair of objects usually only if the match attribute on the match object has no values in common with the base attribute on the base object. The second and third options are "transitivity" flags which can be independently set on either the match or the base object (discussed below). The definition of a search condition can be given as follows in Table III:

TABLE III

Search Condition Definition

Match attribute: <Name of attribute on match object>
Base attribute: <Name of attribute on base object>
Inverted: <True/False>
Match attribute transitive: <True/False>
Base attribute transitive: <True/False>

Normally, a search condition directly tests the immediate values of the match attribute against the immediate values of the base attribute. However, if the transitive flag is turned on for either attribute, then the value set that will be tested for that attribute will actually be the "transitive closure" of the immediate values of the attribute. The transitive closure operation is usually only defined for attributes of reference type, so it is normally invalid to set this flag for a match or base attribute which is not of a reference type. The actual transitive closure operation typically has the standard mathematical definition: the result is the set of all objects reachable through the specified reference attribute in any number of "hops."

For example, the standard "manager" reference-type attribute can be used. For a given user object, the immediate value of the attribute is a reference to the one person who is that user's manager. Additionally, the transitive closure of this attribute is the entire set of the user's manager, the user's manager's manager, and the like, all the way up the management chain of the user in question.

Like the computed attribute definitions discussed above, relationship definitions can be stored in an aggregated identity store schema using an extended DSML grammar. An example of a relationship definition in using an extended DSML grammar can be as follows:

```
<ms-dsml:relationship-type id="Relationship1">
    <dsml:name>Relationship1</dsml:name>
    <ms-dsml:match-filter>
        <ms-dsml:or-condition>
            <ms-dsml:and-condition>
                <ms-dsml:relational-predicate operator="not-contains">
                    <ms-dsml:left-operand>
                        <ms-dsml:mv-attribute ref="department" />
                    </ms-dsml:left-operand>
                    <ms-dsml:right-operand>
                        <ms-dsml:constant-value>Internal Affairs</ms-dsml:constant-value>
                    </ms-dsml:right-operand>
                </ms-dsml:relational-predicate>
            </ms-dsml:and-condition>
        </ms-dsml:or-condition>
    </ms-dsml:match-filter>
    <ms-dsml:base-filter>
        <ms-dsml:or-condition>
            <ms-dsml:and-condition>
                <ms-dsml:relational-predicate operator="substring-any">
                    <ms-dsml:left-operand>
```

```
            <ms-dsml:mv-attribute ref="description" />
          </ms-dsml:left-operand>
          <ms-dsml:right-operand>
            <ms-dsml:constant-value>vendor</ms-dsml:constant-value>
          </ms-dsml:right-operand>
        </ms-dsml:relational-predicate>
      </ms-dsml:and-condition>
    </ms-dsml:or-condition>
  </ms-dsml:base-filter>
  <ms-dsml:search-condition ms-dsml:positive="false">
    <ms-dsml:base-attribute ms-dsml:transitive="false" ref="#company" />
    <ms-dsml:match-attribute ms-dsml:transitive="false" ref="#department" />
  </ms-dsml:search-condition>
  <ms-dsml:search-condition ms-dsml:positive="true">
    <ms-dsml:base-attribute ms-dsml:transitive="true" ref="#manager" />
    <ms-dsml:match-attribute ms-dsml:transitive="false" ref="#assistant" />
  </ms-dsml:search-condition>
</ms-dsml:relationship-type>
```

As noted above, relationship and computed attribute definitions frequently reference other attributes in the identity store schema. According to the given schema, any of these referenced attributes can be themselves computed attributes. Thus a computed attribute can be referenced as a value attribute in another computed attribute. A computed attribute can also be used as a match attribute or base attribute in a search condition. Additionally a computed attribute could be referenced in the match or base filters of a relationship.

These types of nested definitions are allowed to any degree of depth or complexity, such that typically none of the definitions are cyclically related. The dependencies are calculated between the various nested definitions, and calculations are performed in the proper order such that the dependencies are obeyed and all computation results are kept current.

Figure 3:
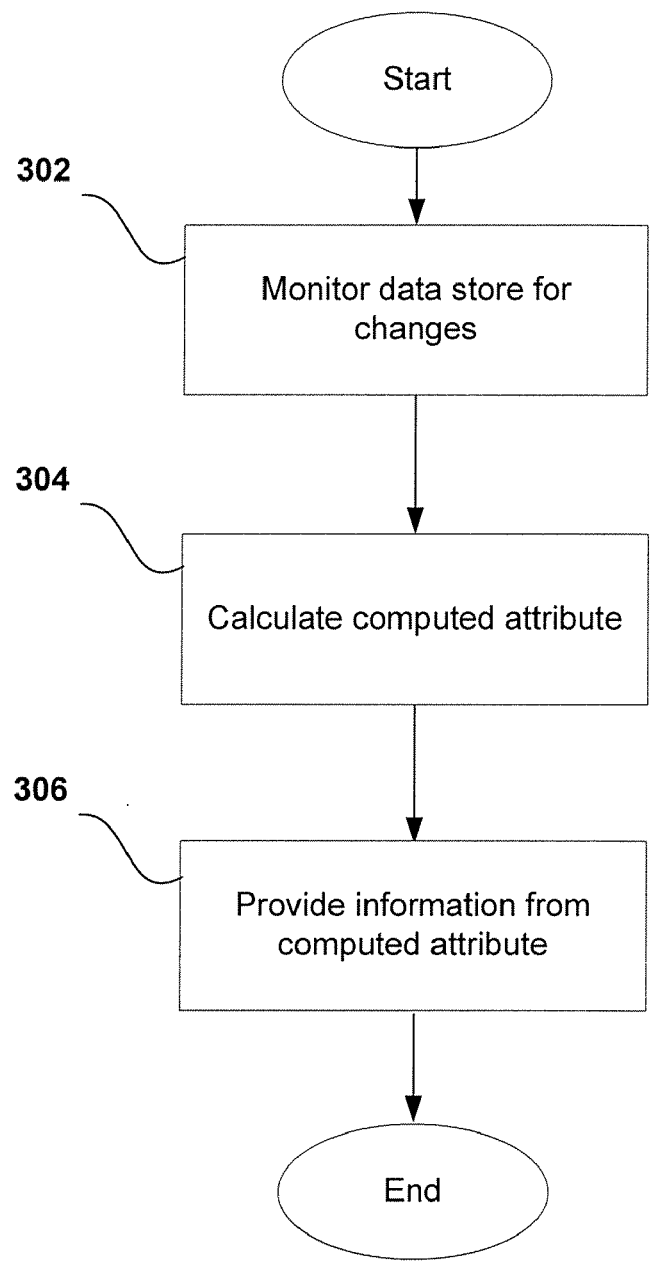
FIG. 3 is a top-level illustration of a flow diagram for dynamic computation of identity attributes.

FIG. 3 is a top-level illustration of a flow diagram for dynamic computation of identity attributes. In operation 302, a data store is monitored for changes to identity-based attributes for structured data and changes to relationships amongst the structured data.

In operation 304, a computed attribute is dynamically computed for a first query. The calculation is performed in response to the detected change as detected by the data store monitoring above. The query can be persisted in a cache for replying to queries that are the same or similar to (sharing some identical components) the first query. The cache can be implemented in a server.

In operation 306, the information from the computed attribute is provided in response to a second query. In various embodiments, the second query can be the same as, a duplicate of, similar to, different from (and the like) as the first query. The second query is received after the computed attribute has been computed.

In various embodiments, the information from the computed attribute can be published (either in conjunction with, or separately from operation 307) by exporting the computed result to a connected system. The connected system can then use the exported results to query against the connected systems querying capabilities.

The above specification, examples and data provide a complete description of the manufacture and use of embodiments of the invention. Since many embodiments of the invention can be made without departing from the spirit and scope of the invention, the invention resides in the claims hereinafter appended.

We claim:

1. A computer-implemented method for dynamic computation of identity-based attributes, comprising:
    using a computing device including a processor for monitoring a data store for changes to identity-based attributes for structured data and changes to relationships amongst the structured data;
    determining when identity-based attributes within the data store change and in response to the changes accessing a base object that holds a computed attribute; wherein values of the computed attribute for the base object are calculated from attribute values present on match objects that are related to the base object; wherein attribute values may depend on more than one value; wherein the base object is associated with one or more match objects through a defined relationship; wherein conditions that define the relationship are established independently of the computations which use those relationships; wherein the defined relationship is defined using any of the following: a match filter that tests a single match object to determine when the match object is a candidate, a base filter that tests a single base object to determine when the base object is a candidate, and one or more search conditions that test conditions between the match object and the base object; wherein the computed attribute can also be used as a match attribute for another computed attribute;
    automatically evaluating the defined relationship of the base object to identify the match objects; accessing each match object to determine when it is a candidate using the match filter, and when it is a candidate applying the one or more search condition that examines both the match object and the base object to determine if a match exists;
    in response to a detected change and determining the base object and related matching objects, dynamically computing the computed attribute for a first query; wherein dynamically computing the computed attribute comprises accessing a computed attribute definition that comprises at least one relationship and at least one value attribute; wherein a relationship description defines the at least one relationship and is stored separately from the computed attribute definition; wherein the relationship description is one or more conditions that is evaluated to determine one or more matches; and
    in response to a second query, providing information from the computed attribute.

2. The method of claim 1 wherein the first and second queries are the same query.

3. The method of claim 1 wherein the second query is received after the computed attribute has been computed.

4. The method of claim 1 wherein the computed attribute is persisted in a cache.

5. The method of claim 4 wherein the computed attribute is distributed to another system.

6. The method of claim 1 wherein the structured data relationship is defined using a filter on a match object, a filter on an object, and a list of search conditions.

7. The method of claim 6 wherein one of the search conditions is an element of a set comprising an inversion element and a transitivity element.

8. The method of claim 7 wherein the components used to define the computed attribute are defined using a schema.

9. The method of claim 1 wherein the values of a computed attribute on a specific object are calculated from the attribute values present on a set of related objects.

10. The method of claim 1 wherein the operations used to compute a computed attribute allows the relocation of values to different operations.

11. The method of claim 10 wherein the operations that modify the content of individual values by using arithmetic and/or string manipulation operators.

12. The method of claim 1 wherein the components used to define the computed attribute comprise a first list of relationships and a second list of value attributes.

13. The method of claim 1 wherein the data store is a normalized identity data store.

14. The method of claim 13 wherein value-level transformations are performed before the data enters the normalized identity store.

15. The method of claim 13 wherein value-level transformations are performed after the data enters the normalized identity store.

16. A system for event-based and/or state changes-based parsing of an input file, comprising:

a processor and a computer readable medium;

using the processor for monitoring a data store for changes to identity-based attributes for structured data and changes to relationships amongst the structured data;

determining when identity-based attributes within the data store change and in response to the changes accessing a base object that holds a computed attribute; wherein values of the computed attribute for the base object are calculated from attribute values present on match objects that are related to the base object; wherein attribute values may depend on more than one value; wherein the base object is associated with one or more match objects through a defined relationship; wherein conditions that define the relationship are established independently of the computations which use those relationships; wherein the defined relationship is defined using any of the following: a match filter that tests a single match object to determine when the match object is a candidate, a base filter that tests a single base object to determine when the base object is a candidate, and one or more search conditions that test conditions between the match object and the base object; wherein the computed attribute can also be used as a match attribute for another computed attribute;

automatically evaluating the defined relationship of the base object to identify the match objects; accessing each match object to determine when it is a candidate using the match filter, and when it is a candidate applying the one or more search condition that examines both the match object and the base object to determine if a match exists;

in response to a detected change and determining the base object and related matching objects, dynamically computing the computed attribute for a first query; wherein dynamically computing the computed attribute comprises accessing a computed attribute definition that comprises at least one relationship and at least one value attribute; wherein a relationship description defines the at least one relationship and is stored separately from the computed attribute definition; wherein the relationship description is one or more conditions that is evaluated to determine one or more matches; and in response to a second query, providing information from the computed attribute.

17. The system of claim 16 wherein a computed attribute is referenced as a value attribute in another computed attribute.

18. A tangible computer storage medium comprising computer-executable instructions for:

monitoring a data store for changes to identity-based attributes for structured data and changes to relationships amongst the structured data;

determining when identity-based attributes within the data store change and in response to the changes accessing a base object that holds a computed attribute; wherein values of the computed attribute for the base object are calculated from attribute values present on match objects that are related to the base object; wherein attribute values may depend on more than one value; wherein the base object is associated with one or more match objects through a defined relationship; wherein conditions that define the relationship are established independently of the computations which use those relationships; wherein the defined relationship is defined using any of the following: a match filter that tests a single match object to determine when the match object is a candidate, a base filter that tests a single base object to determine when the base object is a candidate, and one or more search conditions that test conditions between the match object and the base object; wherein the computed attribute can also be used as a match attribute for another computed attribute;

automatically evaluating the defined relationship of the base object to identify the match objects; accessing each match object to determine when it is a candidate using the match filter, and when it is a candidate applying the one or more search condition that examines both the match object and the base object to determine if a match exists;

in response to a detected change and determining the base object and related matching objects, dynamically computing the computed attribute for a first query; wherein dynamically computing the computed attribute comprises accessing a computed attribute definition that comprises at least one relationship and at least one value attribute; wherein a relationship description defines the at least one relationship and is stored separately from the computed attribute definition; wherein the relationship description is one or more conditions that is evaluated to determine one or more matches; and in response to a second query, providing information from the computed attribute.

19. The tangible medium of claim 18 further comprising providing information from the computed attribute in response to a second query.

20. The tangible medium of claim 18 further comprising using computed attribute as a match attribute or base attribute in a search condition.

* * * * *